United States Patent [19]

Han

[11] Patent Number: 5,320,365
[45] Date of Patent: Jun. 14, 1994

[54] PRECISION AIR CHUCK WITH SPLIT CAM ACTUATOR ASSEMBLY

[76] Inventor: Sil Han, 321 Sunset Dr., Wilmette, Ill. 60091

[21] Appl. No.: 956,636

[22] Filed: Oct. 5, 1992

[51] Int. Cl.⁵ ............................................. B23B 31/16
[52] U.S. Cl. ..................................... 279/121; 279/123
[58] Field of Search ............... 279/121, 123, 124, 152, 279/4.04

[56] References Cited

U.S. PATENT DOCUMENTS 4,966,375 10/1990 Röhm ........................... 279/121 X
5,158,307 10/1992 Toyano et al. ............... 279/124 X Primary Examiner—Timothy V. Eley
Attorney, Agent, or Firm—Ostrager, Chong & Flaherty

[57] ABSTRACT

A precision chuck has a chuck body, top jaws movable radially with respect to a center axis for gripping and releasing a workpiece, master jaws slidably mounted in recesses in the chuck body for radial movement with respect to the center axis and fixedly connected to the respective top jaws, jaw actuators movable linearly parallel to the center axis having inclined cam surfaces slidingly engaged with corresponding surfaces on the master jaws, and an air-operated piston or power bar for moving the jaw actuators. Each of the jaw actuators is positioned at the middle of a respective master jaw and has a pair of spaced-apart actuator leaves engaging opposite sides of the width of the master jaw, thereby applying a balanced driving force to the master jaw without torquing. Further, an improved mounting employing a combination of threaded screw and concentric tubular pin is used to connect the top jaw to the master jaw. Particularly for small-diameter chucks where the mounting area on the master jaw is restricted, the improved mounting takes up a minimum of space so as to allow two screw/pin combinations to be used. The tubular pin can have collet-like slits at an upper part thereof to adjust for any misalignment during jaw assembly.

8 Claims, 6 Drawing Sheets

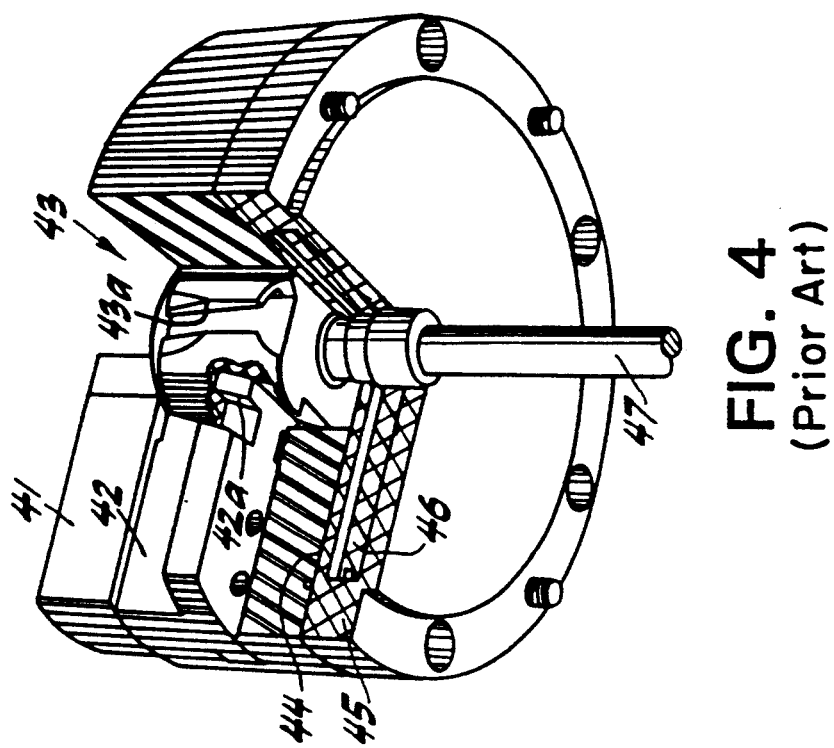
FIG. 4 (Prior Art)
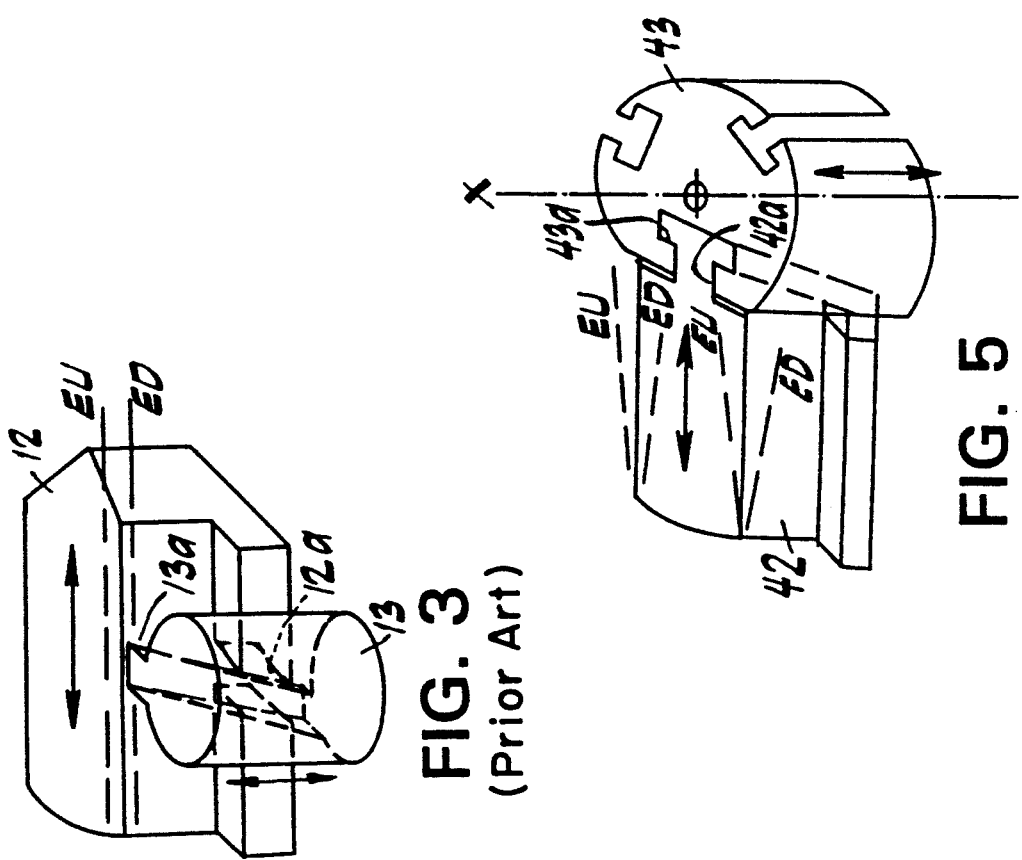
FIG. 5 (Prior Art)
FIG. 3 (Prior Art)

FIG. 9
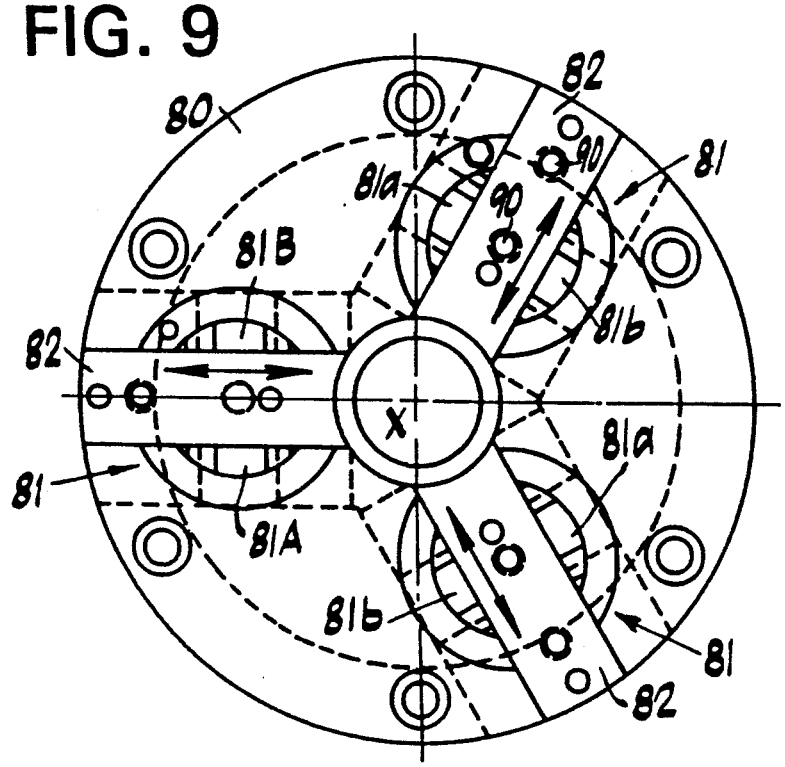
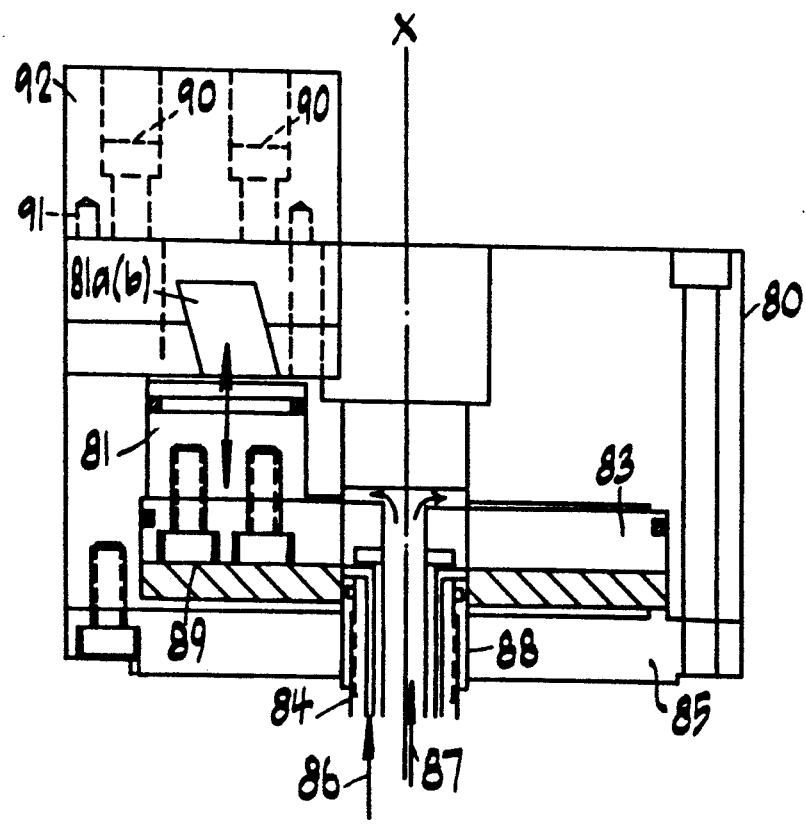
FIG. 10

PRECISION AIR CHUCK WITH SPLIT CAM ACTUATOR ASSEMBLY

FIELD OF THE INVENTION

This invention generally relates to precision air chucks, and particularly to a master jaw actuator assembly for the air chuck jaws that avoids misalignment errors due to jaw torquing and unbalanced jaw loading.

BACKGROUND ART

Precision air chucks generally have a number of (typically three) top jaws arranged symmetrically around a center axis which are moved radially inwardly and outwardly by jaw actuators for gripping and releasing a workpiece. The jaw actuators typically have inclined cam surfaces which slide in axial movement along correspondingly inclined surfaces formed in master jaws fixedly connected to the respective work jaws in order to displace the work jaws radially inwardly and outwardly. The jaw actuators are driven by an air-operated piston. For precision air chucks, it is desirable that the work jaws be able to open and close on a workpiece with exacting repeatability, for example, of the order of 0.000050" (1.25 μ), and to hold the workpiece in an exact axial position under heavy loading.

An example of a conventional air chuck is shown in FIGS. 1 and 2, of which FIG. 1 is a side sectional view of the air chuck shown in plan view in FIG. 2. The air chuck has a chuck body 11 on which three master jaws 12 are mounted in symmetric configuration around a center axis X. The master jaws 12 are slidably retained in linear recesses formed in the chuck body 11 for radial movement inwardly toward and outwardly from the center axis X (indicated by the double-headed arrows in the figures). Each master jaw 12 is fixedly connected to a respective top jaw 21 by screws 23. The top jaws 21 at the front portion of the chuck body 11 are driven by the movement of the master jaws 12 within the chuck body to open and close on a workpiece (not shown). Loading on the top jaws 21 is distributed to the master jaws 12 and chuck body through tightly-fitting dowel-type pins 24 extending through matching bores formed in the master jaws and top jaws.

Each master jaw 12 has an associated jaw actuator 13 which drives the master jaw in radial movement by means of inclined cam surfaces 13a in sliding engagement with correspondingly inclined surfaces 12a formed in the master jaw 12. The jaw actuator is connected to a piston 15 movably arranged in an air cylinder formed between a rear portion of the chuck body 11 and a back cover 16. An air tube 22 is coupled to a manifold 17 at the rear portion of the chuck body, and pressurized air is introduced through air hole 22a to move the piston 15 toward the front of the chuck body, thereby driving the master jaws radially outwardly to open the top jaws 21, and through air hole 22b to move the piston 15 toward the rear of the chuck body, thereby driving the master jaws radially inwardly to close the top jaws 21. A retaining ring 18 couples the piston 15 to the air tube manifold 17, and a center seal 19 is provided at the front end of the air tube manifold. A front cover 20 is provided over each jaw actuator 13.

As illustrated in FIG. 3, it is found that the conventional air chuck, as shown in FIGS. 1 and 2, is subject to jaw actuation errors due to torquing of the master jaw 12 by the jaw actuator 13 arranged at one side thereof. When the jaw actuator 13 moves upward, the friction force of the actuator cam surfaces 13a against the corresponding surfaces 12a generates a torque which tends to push the master jaw 12 up on one side, causing a displacement error EU which can lead to misalignment of the master jaw. Similarly, when the jaw actuator 13 moves downward, the torque generated tends to push the one side of the master jaw 12 down, causing a displacement error ED. These displacement errors tend to degrade the precision repeatability of the opening and closing positions of the master jaws.

Another type of air chuck is shown in FIG. 4 having top jaws 41, master jaws 42, air cylinder cover 44, back cover 45, piston 46, and air tube 47. In this type of air chuck, a center plunger or wedger 43 has pairs of inclined cam surfaces 43a formed at symmetric positions thereon which coact with opposed inclined surfaces formed at the respective inward ends of the three master jaws 42. However, as shown in FIG. 5, this type of power chuck also has the problem of displacement errors EU and ED caused by torquing of the master jaws. Since the wedger 43 exerts frictional forces on the inward ends of the master jaws, the master jaws tend to be deflected upward and downward at their inward ends.

Another problem that occurs particularly with small diameter chucks, e.g., 2-inch or 3-inch diameter chucks, is distortion of the top jaws under loading forces. As illustrated in FIGS. 6, 7, 8, a small-diameter chuck includes a chuck body 60, top jaws 61, master jaws 62, and jaw actuators 63 as previously described. The small-diameter chuck has a relatively small mounting area available on the chuck face, thus the length of each master jaw 62 is relatively short, e.g., of the order of 0.75 to 1.0 inch. As a result, the connecting elements between the master jaw 62 and top jaw 61 are limited by the restricted space usually to a single screw 65 and two dowel-type pins 64a and 64b. As shown schematically in FIG. 8, the top jaws usually have a step 66 for seating the workpiece W on the chuck. The step 66 raises the level of the workpiece around the height of the head of the screw 65. Thus, the loading forces F from the workpiece W become applied at an intermediate height of the top jaw 61 against the head of the single screw 65. The high loading forces on the single screw can result in slight deflection LD of the top jaw from the master jaw, causing misalignment and loss of precision. Particularly in the case of a workpiece having a cylindrical shape, the deflection can reduce the narrow band of contact between the top jaw and the workpiece, thereby reducing the gripping force on the workpiece.

Moreover, the dowel-type pins 64a and 64b of the chucks are very difficult to assemble between the master jaw 62 and the top jaw 61 because the bores for the pins in the two jaw parts must be precisely the same dimension and matched in position. The top jaw 61 is often replaced or changed with other top jaw parts and may have bores that do not precisely match those in the master jaw, thereby making it difficult to assemble it to the top jaw.

SUMMARY OF THE INVENTION

The present invention seeks to correct the problems of misalignment errors in the conventional precision air chucks due to jaw torquing and unbalanced jaw loading.

In accordance with a first aspect of the present invention, a precision chuck comprises: (a) a chuck body; (b) a plurality of top jaws arranged symmetrically around a center axis of the chuck body which are movable in radial directions toward and away from the center axis for gripping and releasing a workpiece, respectively; (c) a corresponding plurality of master jaws which are slidably mounted in recesses formed in the chuck body for movement in the radial directions toward and away from the center axis and which are fixedly connected to respective ones of the top jaws; (d) a corresponding plurality of jaw actuators movable in reciprocal linear directions parallel to the center axis and having inclined cam surfaces slidingly engaged with corresponding inclined surfaces formed on the master jaws; and (e) moving means for moving the jaw actuators in the reciprocal linear directions in order to drive the top jaws to closed and open positions for gripping and releasing the workpiece, wherein each of the master jaws has an elongated body of a given length and width between a radially inward end and outward end thereof, and each of the jaw actuators is positioned at an intermediate position along the length of a respective master jaw and has a pair of spaced-apart actuator leaves projecting therefrom having respective inclined cam surfaces thereon for slidingly engaging corresponding inclined surfaces formed on opposite sides of the width of the master jaw. The split cam leaves of the jaw actuators movable in the reciprocal linear directions on opposing sides at the middle of the master jaws apply a balanced driving force to the master jaws for driving them in the corresponding radial directions without torquing them out of alignment with the center axis of the chuck. Besides air chucks, the jaw actuators with the split cam leaves may also be used in precision chucks of the type employing a center power bar for actuator movement, particularly in small-diameter chucks.

In accordance with a second aspect of the present invention, an improved mounting for fixedly connecting an upper jaw part to a lower jaw part comprises: (a) a tapped hole of a given diameter and length extending through the upper jaw part and at least partway into the lower jaw part; (b) a mounting screw threaded in the tapped hole for connecting the jaw parts together; (c) a bore having a diameter substantially wider and a length substantially shorter than that of the tapped hole and being formed concentrically with the tapped hole so as to define an annular recess extending connectively between the upper and lower jaw parts and spaced around the screw threaded in the tapped hole; and (d) a hollow tubular pin provided in the annular recess having an inner diameter which provides a slight clearance around the screw and an outer diameter dimensioned so as to provide a tight fit in the bore extending between the two jaw parts. The combination of threaded screw and concentric tubular pin provides in a minimum of space the dual functions of tightly connecting the jaw parts together and securely transferring loading forces on the upper jaw part to the lower jaw part. For small-diameter chucks, a pair of such threaded screws and concentric tubular pins can fit in the small available area for mounting the top jaw to the master jaw, and can provide more than twice the precision holding strength as compared to the conventional single-screw, dual-pin configuration. The tubular pin for the screw at the radially outward position can also have collet-like slits to adjust for misalignments of the pin bores during jaw assembly.

Other objects, features and advantages of the present invention will be apparent from the following detailed description of the preferred embodiments with reference to the drawings, of which:

BRIEF DESCRIPTION OF THE DRAWINGS

FIG. 3 illustrates a torquing problem of the conventional air chuck of FIG. 1.

FIG. 4 is a perspective sectional view of another type of conventional chuck having a wedger actuator engaged at the inward ends of the master jaws.

FIG. 5 illustrates a torquing problem of the conventional air chuck of FIG. 4.

FIG. 9 is a plan view of a precision air chuck in accordance with the present invention having jaw actuators provided with a pair of spaced-apart cam surfaces for balanced engagement on opposing sides of the master jaws.

FIG. 10 is a side sectional view of the precision chuck of FIG. 9.

DETAILED DESCRIPTION OF THE INVENTION

Figure 2:
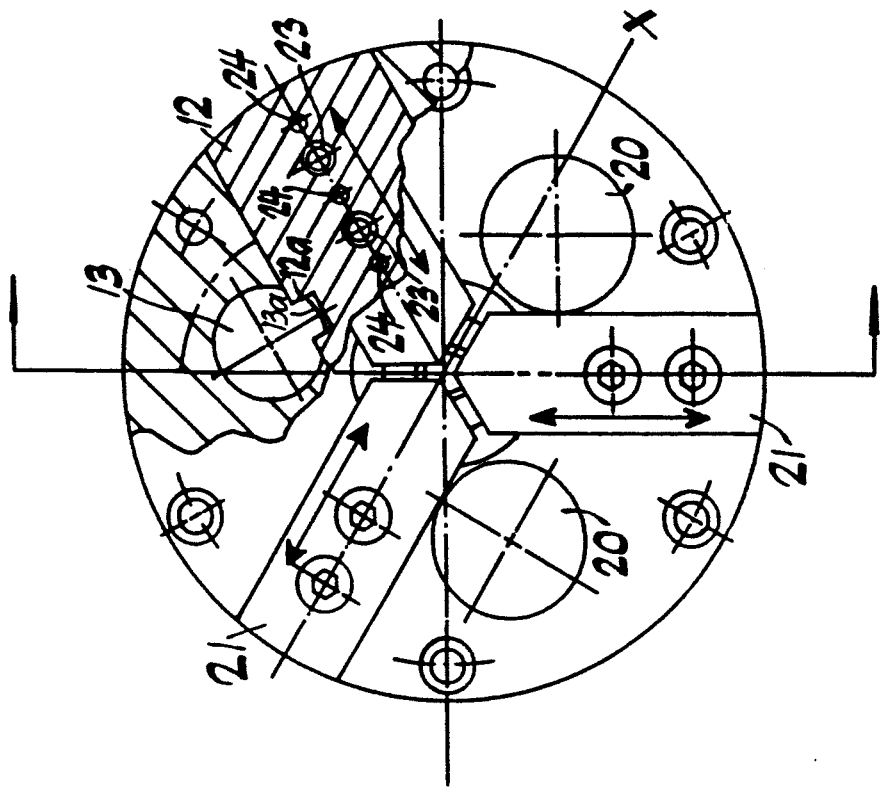
FIG. 2 is view of the conventional air chuck of FIG. 1.
Figure 1:
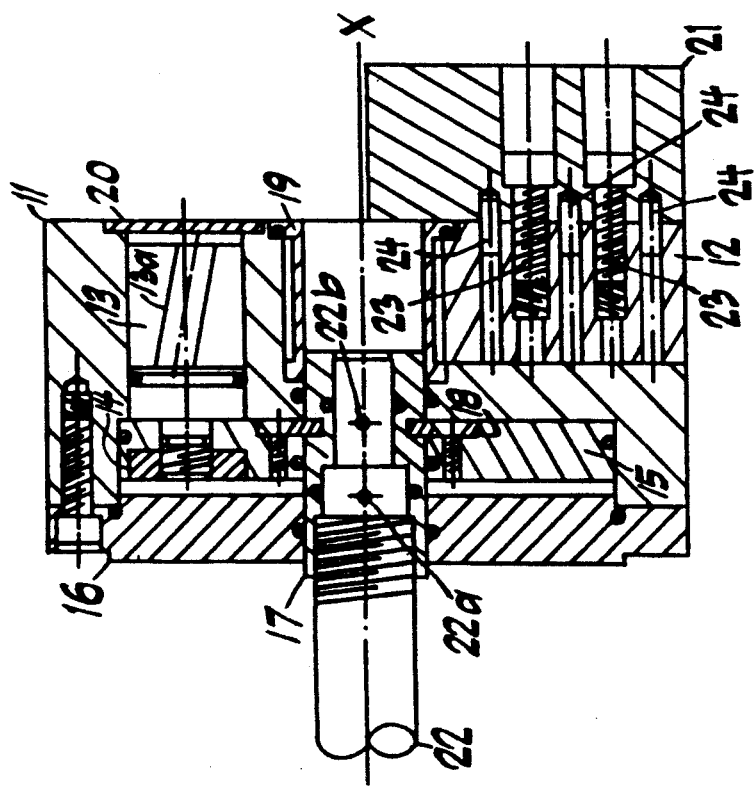
FIG. 1 a side sectional view of a conventional air chuck having jaw actuators arranged at one side of the master jaws.

A precision air chuck in accordance with the present invention is shown in FIGS. 9 and 10. The precision air chuck has a chuck body 80 on which three master jaws 82 are mounted in symmetric configuration around a center axis X. The master jaws 82 are slidably retained in linear recesses formed in the chuck body 80 for radial movement toward and away from the center axis X (indicated by the double-headed arrows in the figures). Each master jaw 82 is fixedly connected to a respective top jaw 92 by screws 90. The top jaws 92 are driven by the movement of the master jaws 82 to closed and open positions for gripping and releasing a workpiece (not shown). Loading on the top jaws 92 is distributed to the master jaws 82 and the chuck body through the dowel-type pins 91 extending through matching bores formed in the master and top jaws.

Figure 11:
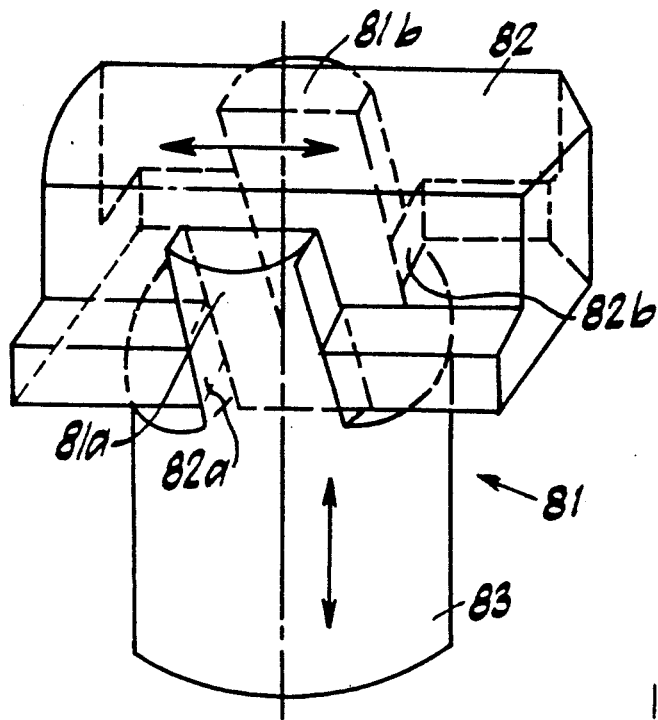
FIG. 11 illustrates the balanced forces applied to the master jaw by the jaw actuator of the present invention.

Each master jaw 82 has an associated jaw actuator 81 which is positioned at an intermediate position along the length of the master jaw 82. The jaw actuator 81 has a pair of spaced-apart actuator leaves 81a and 81b projecting toward the front side of the chuck body 80. The actuator leaves 81a and 81b have respective inclined cam surfaces thereon for slidingly engaging corresponding inclined surfaces formed on opposite sides of the width of the master jaw 82. As illustrated more clearly in FIG. 11, actuating movement of the jaw actuator 81 and split cam leaves 81a and 81b in reciprocal vertical directions, under driving movement of the piston 83, results in a balanced driving force being applied to the corresponding inclined surfaces 82a and 82b at the middle position of the master jaw 82. Thus, the master jaw 82 can be driven in the radial directions without torquing them out of alignment with the center axis of the chuck. This balanced application of driving forces results in maintenance of a stable alignment of the master jaws and a high precision of repeatability in the movement of the top jaws for gripping and releasing the workpiece.

The jaw actuators 81 are connected by screws 89 to a piston 83 movably arranged in an air cylinder formed between a rear portion of the chuck body 80 and a back cover 85. An air tube 84 is coupled to a manifold 88 at the rear portion of the chuck body 80, and pressurized air is introduced through one inlet (arrow 86) to move the piston 83 toward the front (up arrow direction) of the chuck body to close the top jaws 92, and through another inlet (arrow 87) to move the piston 83 toward the rear (down arrow direction) of the chuck body to open the top jaws 92.

Figure 12:
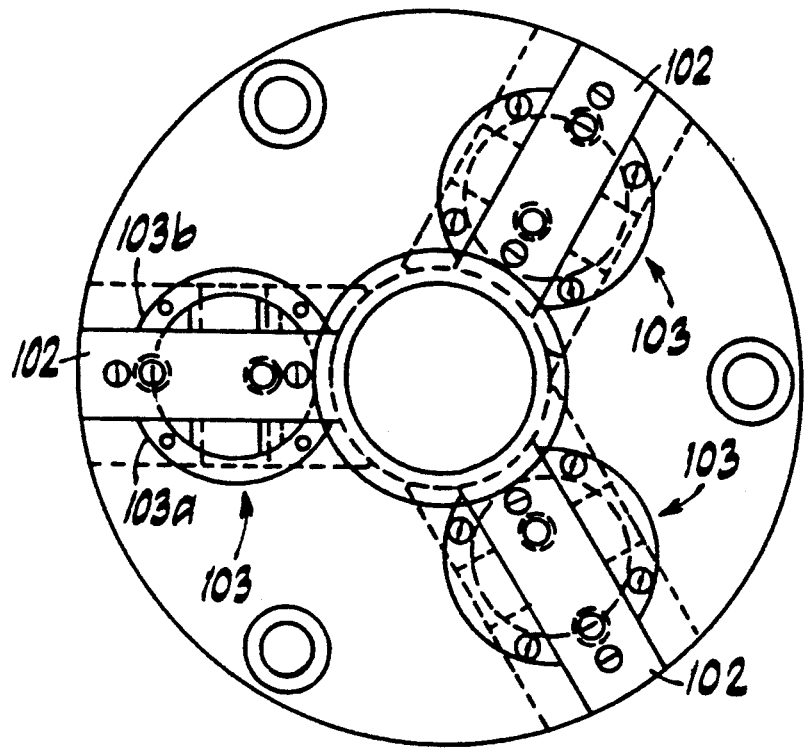
FIG. 12 is a plan view of another version of the precision chuck of the present invention employing a power bar actuator instead of an air tube.
Figure 13:
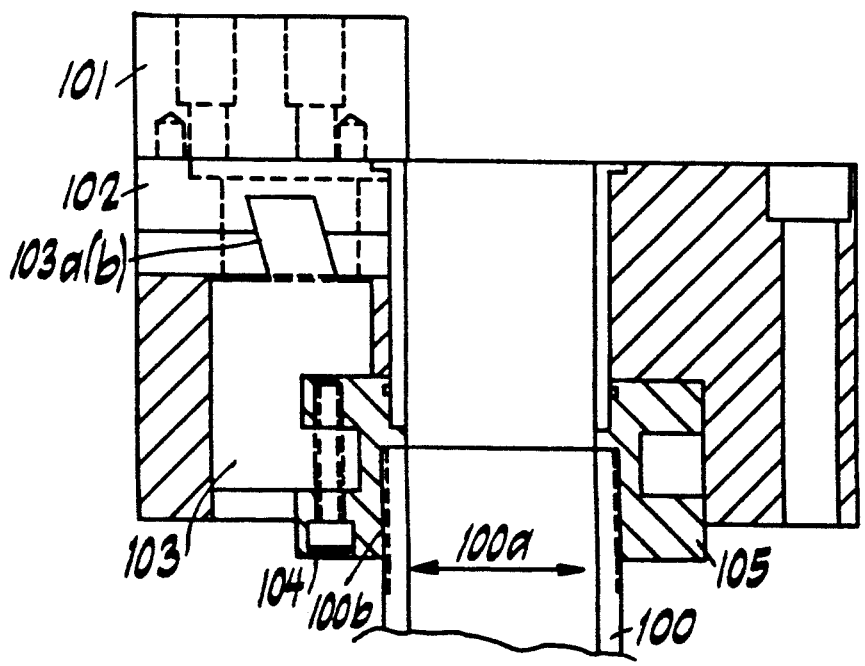
FIG. 13 is a side sectional view of the precision chuck of FIG. 11.

Another version of the precision chuck in accordance with the present invention is shown in FIGS. 12 and 13 having a power bar 100 supplying the actuating force instead of an air tube. The chuck has top jaws 101 connected to master jaws 102, each of which is engaged on opposite sides of its width with the spaced-apart leaves 103a and 103b of a respective jaw actuator 103. The jaw actuator 103 has a lower part which is coupled to a movable block 105 by a screw 104, and the power bar 100 is secured by threads 100b to the block 105. By this arrangement, the driving force to the jaw actuators for moving the top jaws can be applied through the power bar without the need for an air piston assembly. This is particularly advantageous for small-diameter chucks in which the use of a power bar can save a substantial amount of space in the center of the chuck. Also, the power bar 100 has a through-hole 100a which can accommodate a long-bar workpiece.

Figure 7:
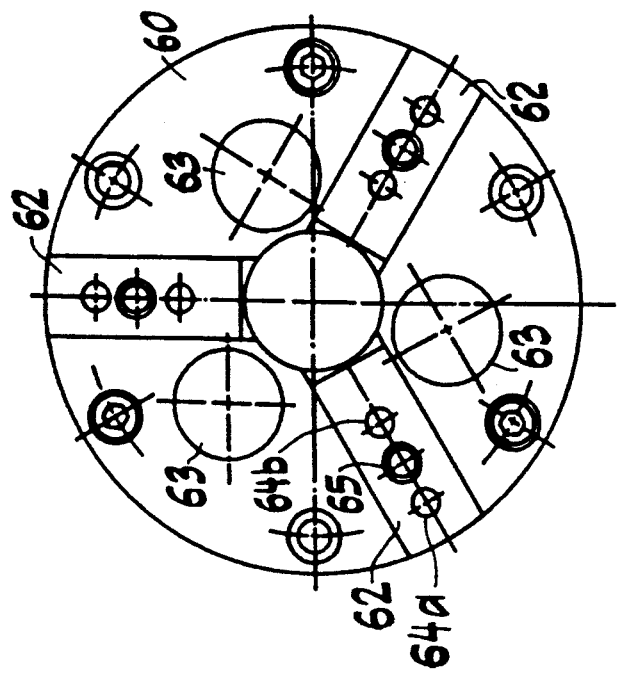
FIG. 7 is a plan view of the conventional small-diameter chuck of FIG. 6.
Figure 8:
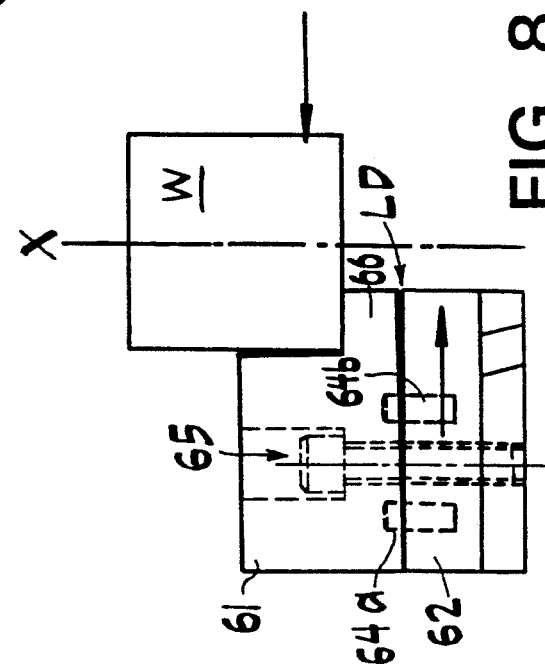
FIG. 8 illustrates a loading problem of the conventional small-diameter chuck of FIG. 6.
Figure 6:
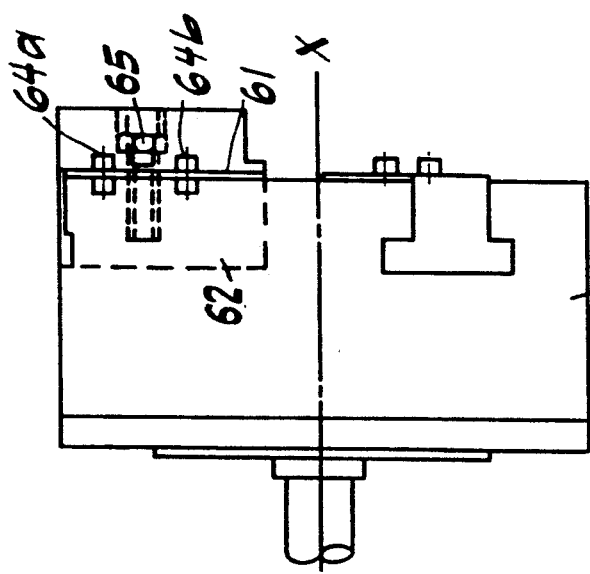
FIG. 6 is a side view partly in section of a conventional small-diameter chuck having a mounting for jaw parts of the single screw, dual pin configuration.

A second aspect of the present invention is an improved mounting for fixedly connecting an upper jaw part to a lower jaw part. In the small-diameter chuck, for example, as previously shown in FIGS. 6–8, the small area of the chuck restricts the master jaw 62 to a short length which, conventionally, can only accommodate a single tap screw and two dowel-type pins. The screw always requires some amount of clearance for threading in the tapped hole. The dowel-type pins must fit tightly in the bores of the jaws in order to hold the top jaws from deflection under loading forces. Because of the required tight fit, the dowel-type pins are given a relatively short length, e.g., half the length of the screw. If a loading force is applied at an intermediate position of the top jaw 61, such as when the workpiece has a rounded shape, the full loading force may become applied against only the head of the single screw, which may not be sufficiently strong to prevent deflection or misalignment of the top jaw 61.

Figure 14:
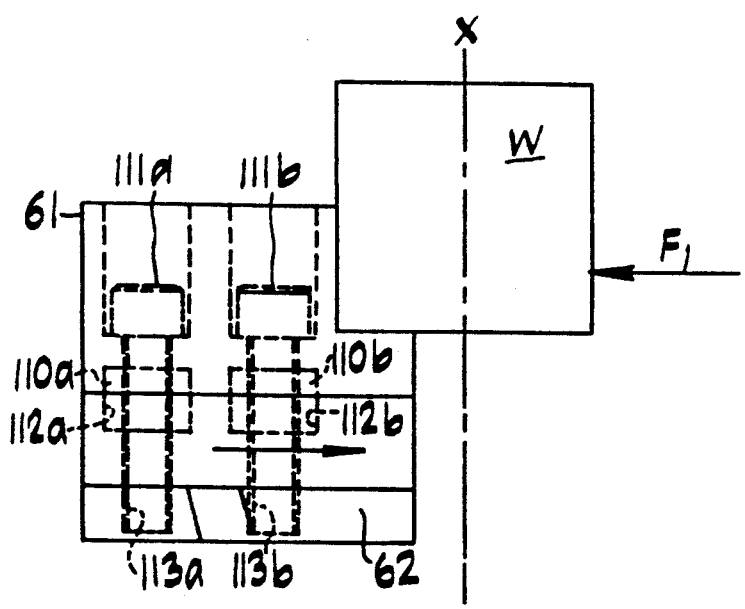
FIG. 14 is a side sectional view of an improved mounting using a threaded screw and concentric tubular pin for connecting upper and lower jaw parts in accordance with another aspect of the invention.

As shown in FIG. 14, a tubular pin 110a, 110b is used in the present invention in combination with a screw 111a, 111b such that two HPC-P3 screw/pin combinations 110a/111a and 110b/111b can fit in the mounting area of the jaws of a small-diameter chuck. The tubular pin 110 is tightly fitted in a bore 112a, 112b having a diameter substantially wider and a length substantially shorter than that of the tapped hole 113 for the screw 111. The bore 112 is formed concentrically with the tapped hole 113a, 113b so as to define an annular recess extending connectively between the top jaw 61 and master jaw 62. The tubular pin is hollow and has an inner diameter which provides a slight clearance around the screw 111. Its outer diameter is dimensioned so as to provide a tight fit in the bore extending between the two jaw parts. For example, the screw for a 3-inch chuck may have a diameter of 0.190 inch, while the tubular pin has an outer diameter of 0.330 inch and an inner diameter of 0.210 inch, with a clearance of about 0.010 inch around the screw. Each screw/pin combination occupies substantially the same area on the master jaw of only the screw itself, while providing the dual functions of tightly connecting the jaw parts together and securely transferring loading forces on the top jaw to the master jaw. In addition, the reduced amount of space required allows two screw/pin combinations to fit in the available area of a small-diameter chuck, which can provide more than twice the strength of the conventional single-screw, dual-pin configuration.

Figure 15:
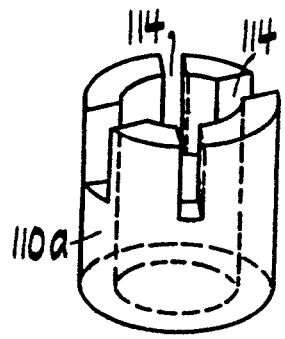
FIG. 15 is a component view of the concentric tubular pin having the further feature of collet-like slits at one end to facilitate jaw assembly.

Referring to FIG. 15, the hollow tubular pin 110a at the radially outward position may further be formed with collet-like slits 114 at the upper part thereof to be held in its bore in the top jaw. The pins are high precision parts which are machined for a tight (slight interference) fit in the bores of the jaw parts. When the top jaw is replaced or changed, the bores of the jaw parts may not match precisely, making it difficult to seat both pins with a tight fit in the bores simultaneously. The collet-like slits on the upper part of the tubular pin 110a provide a small amount of deformation which allows adjustment for any misalignment of the bores, e.g., of the order of 0.0001 inch to 0.0005 inch. Thus, when a replacement or other top jaw is to be assembled on the master jaw, the lower parts of the solid tubular pin 110b and slitted tubular pin 110a are first seated in the radially inward and outward bores of the master jaw, respectively. The upper part of the solid tubular pin 110b is then seated in the radially inward bore of the top jaw, while the upper part of the slitted tubular pin 110a can be seated like a follower in the radially outward bore of the top jaw. The collet-like slits of the tubular pin 110a can accommodate any misalignment at the radially outward bore of the top jaw if the bores do not match precisely.

Although the invention has been described with reference to certain preferred embodiments, it will be appreciated that many variations and modifications may be made consistent with the broad principles of the invention. It is intended that the preferred embodiments and all of such variations and modifications be included within the scope and spirit of the invention, as defined in the following claims.

I claim:

1. A precision chuck comprising:
   (a) a chuck body;
   (b) a plurality of top jaws arranged symmetrically around a center axis of the chuck body which are movable in radial directions toward and away from the center axis for gripping and releasing a workpiece, respectively;

(c) a corresponding plurality of master jaws which are slidably mounted in recesses formed in the chuck body for movement in the radial directions toward and away from the center axis and which are fixedly connected to respective ones of the top jaws;

(d) a corresponding plurality of jaw actuators movable in reciprocal linear directions parallel to the center axis and having inclined cam surfaces slidingly engaged with corresponding inclined surfaces formed on the master jaws; and (e) moving means for moving the jaw actuators in the reciprocal linear directions in order to drive the top jaws to closed and open positions for gripping and releasing the workpiece, respectively, wherein each of the master jaws has an elongated body of a given length and width between a radially inward end and outward end thereof, and each of the jaw actuators is formed as a single, integral piece which is positioned at an intermediate position along the length of a respective master jaw and has a pair of spaced-apart actuator leaves integrally formed therewith and projecting therefrom having respective inclined cam surfaces thereon for slidingly engaging corresponding inclined surfaces formed on opposite sides of the width of the master jaw, whereby movement of the jaw actuators in the reciprocal linear directions applies a balanced driving force to the master jaws for movement in the radial directions without torquing of the master jaws.

2. A precision chuck according to claim 1, wherein said moving means is an air-actuated piston fixedly connected to the plurality of master jaws.

3. A precision chuck according to claim 1, wherein said moving means is a mechanically-actuated power bar having key portions fixedly connected to respective ones of the plurality of jaw actuators.

4. A precision chuck comprising:
(a) a chuck body;
(b) a plurality of top jaws arranged symmetrically around a center axis of the chuck body which are movable in radial directions toward and away from the center axis for gripping and releasing a workpiece, respectively;
(c) a corresponding plurality of master jaws which are slidably mounted in recesses formed in the chuck body for movement in the radial directions toward and away from the center axis and which are fixedly connected to respective ones of the top jaws;
(d) a corresponding plurality of jaw actuators movable in reciprocal linear directions parallel to the center axis and having inclined cam surfaces slidingly engaged with corresponding inclined surfaces formed on the master jaws; and
(e) moving means for moving the jaw actuators in the reciprocal linear directions in order to drive the top jaws to closed and open positions for gripping and releasing the workpiece, respectively, wherein each of the master jaws has an elongated body of a given length and width between a radially inward end and outward end thereof, and each of the jaw actuators is positioned at an intermediate position along the length of a respective master jaw and has a pair of spaced-apart actuator leaves projecting therefrom having respective inclined cam surfaces thereon for slidingly engaging corresponding inclined surfaces formed on opposite sides of the width of the master jaw, whereby movement of the jaw actuators in the reciprocal linear directions applies a balanced driving force to the master jaws for movement in the radial directions without torquing of the master jaws, and further comprising an improved mounting for fixedly connecting each top jaw to a respective master jaw, said improvement having:
(a) a tapped hole of a given diameter and length extending through the top jaw and at least partway into the master jaw;
(b) a screw threaded in the tapped hole for connecting the top and master jaw together;
(c) a screw threaded in the tapped hole for connecting the top and master jaw together;
(c) a bore having a diameter substantially wider and a length substantially shorter than that of the tapped hole and being formed concentrically with the tapped hole so as to define an annular recess extending connectively between the top jaw and master jaw and spaced around the screw threaded in the tapped hole; and
(d) a hollow tubular pin provided in the annular recess having an inner diameter which provides a slight clearance around the screw and an outer diameter dimensioned so as to provide a tight fit in the bore extending between the top and master jaw, whereby the threaded screw and concentric tubular pin provide in a minimum of space the dual functions of tightly connecting the jaw parts together and securely transferring loading forces on the top jaw to the master jaw.

5. A precision chuck according to claim 4, wherein said chuck is a small-diameter chuck, and a pair of said improved mountings employing respective threaded screws and concentric tubular pins are provided at radially inward and outward positions for mounting the top jaw to the master jaw.

6. A precision chuck according to claim 5, wherein the tubular pin at the radially outward position has collet-like slits at an upper part fitting in the bore in the top jaw to adjust for any misalignment during jaw assembly.

7. A precision chuck comprising:
(a) a chuck body;
(b) a plurality of top jaws arranged symmetrically around a center axis of the chuck body which are movable in radial directions toward and away from the center axis for gripping and releasing a workpiece, respectively;
(c) a corresponding plurality of master jaws which are slidably mounted in recesses formed in the chuck body for movement in the radial directions toward and away from the center axis and which are fixedly connected to respective ones of the top jaws;
(d) a corresponding plurality of jaw actuators movable in reciprocal linear directions parallel to the center axis and having inclined cam surfaces slidingly engaged with corresponding inclined surfaces formed on the master jaws; and
(e) moving means for moving the jaw actuators in the reciprocal linear directions in order to drive the top jaws to closed and open positions for gripping and releasing the workpiece, respectively, wherein each of the master jaws has an elongated body of a given length and width between a radially inward end and outward end thereof, and each of the jaw actuators is positioned at an intermediate position along the length of a respective master jaw and has a pair of spaced-apart actuator leaves projecting therefrom having respective inclined cam surfaces thereon for slidingly engaging corresponding inclined surfaces formed on opposite sides of the width of the master jaw, whereby movement of the jaw actuators in the reciprocal linear directions applies a balanced driving force to the master jaws for movement in the radial directions without torquing of the master jaws, and further comprising:

(a) a tapped hole of a given diameter and length formed at radially inward and outward positions extending through a top jaw and at least partway into a respective master jaw;

(b) a pair of screws threaded in the tapped holes at the radially inward and outward positions, respectively, for connecting the top and master jaw together;

(c) a pair of bores having a diameter substantially wider and a length substantially shorter than that of the tapped holes and being formed concentrically with the respective tapped holes so as to define the top jaw and master jaw and spaced around the screws threaded in the tapped holes; and (d) a pair of hollow tubular pin provided in the respective annular recess, each tubular pin having an inner diameter which provides a slight clearance around the respective screw and an outer diameter dimensioned so as to provide a tight fit in the bore extending between the top and master jaw, whereby the pairs of threaded screw and concentric tubular pins provide in a minimum of space the dual functions of tightly connecting the jaw parts together and securely transferring loading forces on the top jaw to the master jaw.

8. A precision air chuck according to claim 7, wherein the tubular pin at the radially outward position has slits formed in an upper part thereof fitting in the bore in the top jaw to adjust for any misalignment during jaw assembly.

* * * * *